(12) United States Patent
Sassatelli

(10) Patent No.: US 9,452,539 B2
(45) Date of Patent: *Sep. 27, 2016

(54) GLOVE PORT SAFETY MECHANISM

(71) Applicant: I.M.A. Industria Macchine Automatiche S.p.A., Ozzano dell'Emilia (IT)

(72) Inventor: Luca Sassatelli, Ozzano dell'Emilia (IT)

(73) Assignee: I.M.A. Industria Macchine Automatiche S.p.A. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,234

(22) Filed: Nov. 5, 2014

(65) Prior Publication Data

US 2015/0082700 A1     Mar. 26, 2015

Related U.S. Application Data

(63) Continuation of application No. 13/879,054, filed as application No. PCT/IB2011/054382 on Oct. 5, 2011, now Pat. No. 8,944,988.

(30) Foreign Application Priority Data

Oct. 15, 2010   (IT) ............................... BO2010A0622

(51) Int. Cl.
| | |
|---|---|
| *B25J 21/02* | (2006.01) |
| *E05F 15/40* | (2015.01) |
| *E05F 15/00* | (2015.01) |
| *E05F 15/20* | (2006.01) |
| *G08B 21/18* | (2006.01) |

(52) U.S. Cl.
CPC ............ *B25J 21/02* (2013.01); *E05F 15/0004* (2013.01); *E05F 15/2015* (2013.01); *E05F 15/2023* (2013.01); *E05F 15/40* (2015.01); *G08B 21/187* (2013.01); *Y10T 16/5398* (2015.01); *Y10T 16/53984* (2015.01)

(58) Field of Classification Search
CPC .............................. B25J 21/02; G08B 21/187
USPC ............................. 600/22; 16/319, 350, 351
See application file for complete search history.

(56) References Cited

U.S. PATENT DOCUMENTS

| | | | |
|---|---|---|---|
| 178,568 A | | 6/1876 | Walker et al. |
| 309,938 A | * | 12/1884 | Farnum ......................... 202/247 |
| 793,239 A | * | 6/1905 | Snowdon ................ E05D 11/00 16/351 |
| 1,009,125 A | | 11/1911 | Zempliner |

(Continued)

FOREIGN PATENT DOCUMENTS

| | | |
|---|---|---|
| DE | 20122621 U1 | 9/2006 |
| EP | 0662373 A1 | 12/1995 |
| WO | 0246555 A1 | 6/2002 |

*Primary Examiner* — Katherine Mitchell
*Assistant Examiner* — Marcus Menezes
(74) *Attorney, Agent, or Firm* — Laubscher, Spendlove & Laubscher, P.C.

(57) ABSTRACT

A safety device for a glove port includes a hatch that is rotatably fixable by a hinge to an outer frame of a glove port so as to rotate between a closing position and an opening position for preventing or allowing access to the glove port, respectively. The device further includes a sensor associated with the glove port and arranged for engaging and/or detecting an abutment portion of said the hatch in the closing condition and generating an alarm signal when the abutment portion does not engage the sensor means, in particular when the hatch is not in the closing position.

4 Claims, 4 Drawing Sheets

(56) References Cited

U.S. PATENT DOCUMENTS

| | | | | |
|---|---|---|---|---|
| 1,920,509 A | * | 8/1933 | Jones et al. | 16/313 |
| 2,705,338 A | | 4/1955 | Platt | |
| 2,840,848 A | * | 7/1958 | Hickey | 16/313 |
| 3,222,806 A | * | 12/1965 | Martin | 49/237 |
| 3,381,414 A | * | 5/1968 | Brown | 49/281 |
| 3,714,736 A | * | 2/1973 | Weaver | 49/237 |
| 4,241,337 A | * | 12/1980 | Prada | 340/547 |
| 4,364,200 A | | 12/1982 | Cobb | |
| 4,543,458 A | | 9/1985 | Holce et al. | |
| 4,631,777 A | * | 12/1986 | Takimoto | 16/315 |
| 4,697,306 A | * | 10/1987 | Rhodes | 16/317 |
| 4,773,392 A | | 9/1988 | Koch | |
| 4,788,965 A | * | 12/1988 | Milani et al. | 600/22 |
| 5,025,531 A | | 6/1991 | McCarty | |
| 5,817,004 A | | 10/1998 | Koch | |
| 6,293,902 B1 | * | 9/2001 | Hundertmark et al. | 600/22 |
| 6,491,621 B1 | * | 12/2002 | Dykes | 600/22 |
| 6,711,937 B2 | | 3/2004 | Richards et al. | |
| 6,929,597 B2 | * | 8/2005 | Hampe | 600/22 |
| 7,945,996 B2 | * | 5/2011 | Gunderson | 16/312 |
| 2003/0005643 A1 | * | 1/2003 | Yang | E05B 65/0007 49/463 |
| 2004/0045222 A1 | * | 3/2004 | Hicks | E05F 1/066 49/394 |
| 2004/0118309 A1 | * | 6/2004 | Fedor | B22F 3/1055 101/480 |
| 2005/0020872 A1 | * | 1/2005 | Hampe | 600/22 |
| 2010/0286471 A1 | * | 11/2010 | Matsubara et al. | 600/22 |

* cited by examiner

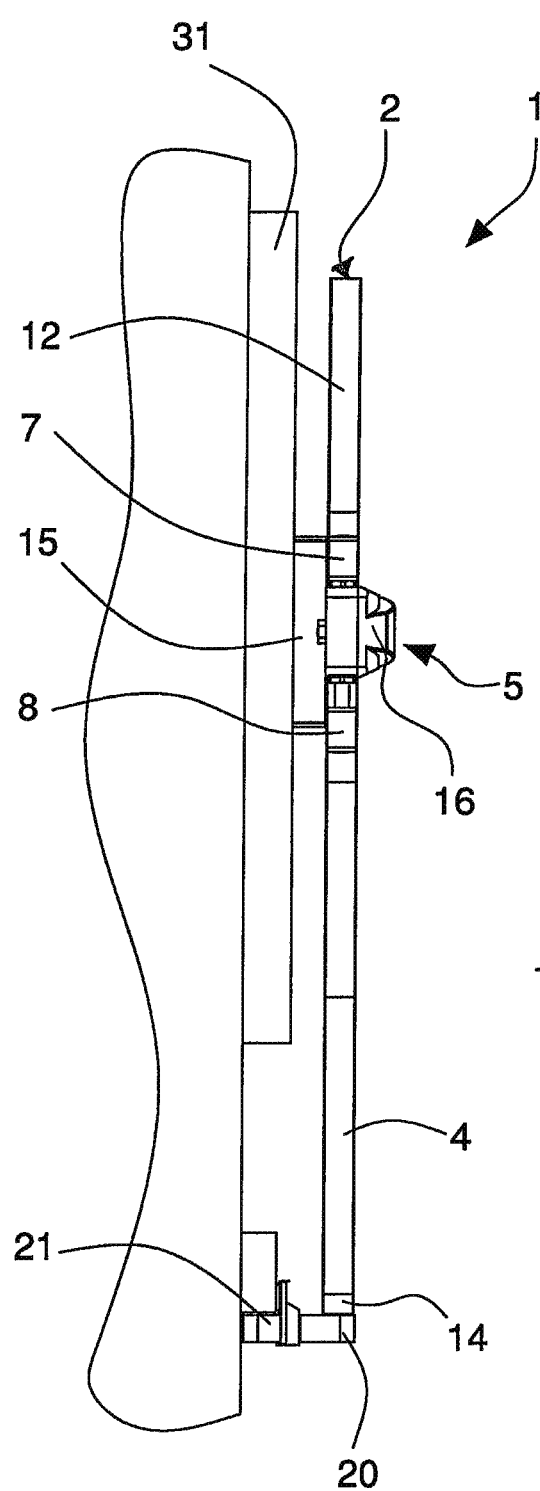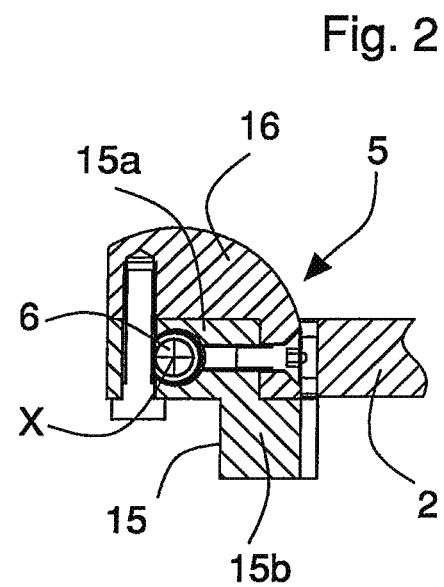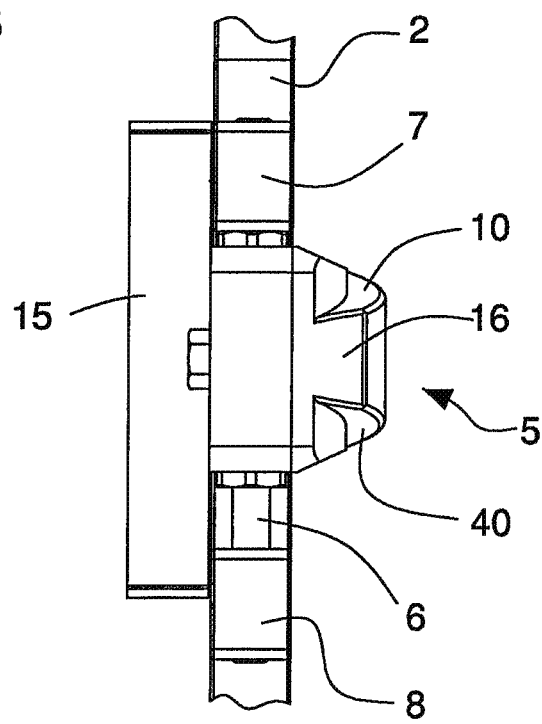
Fig. 2
Fig. 3
Fig. 4

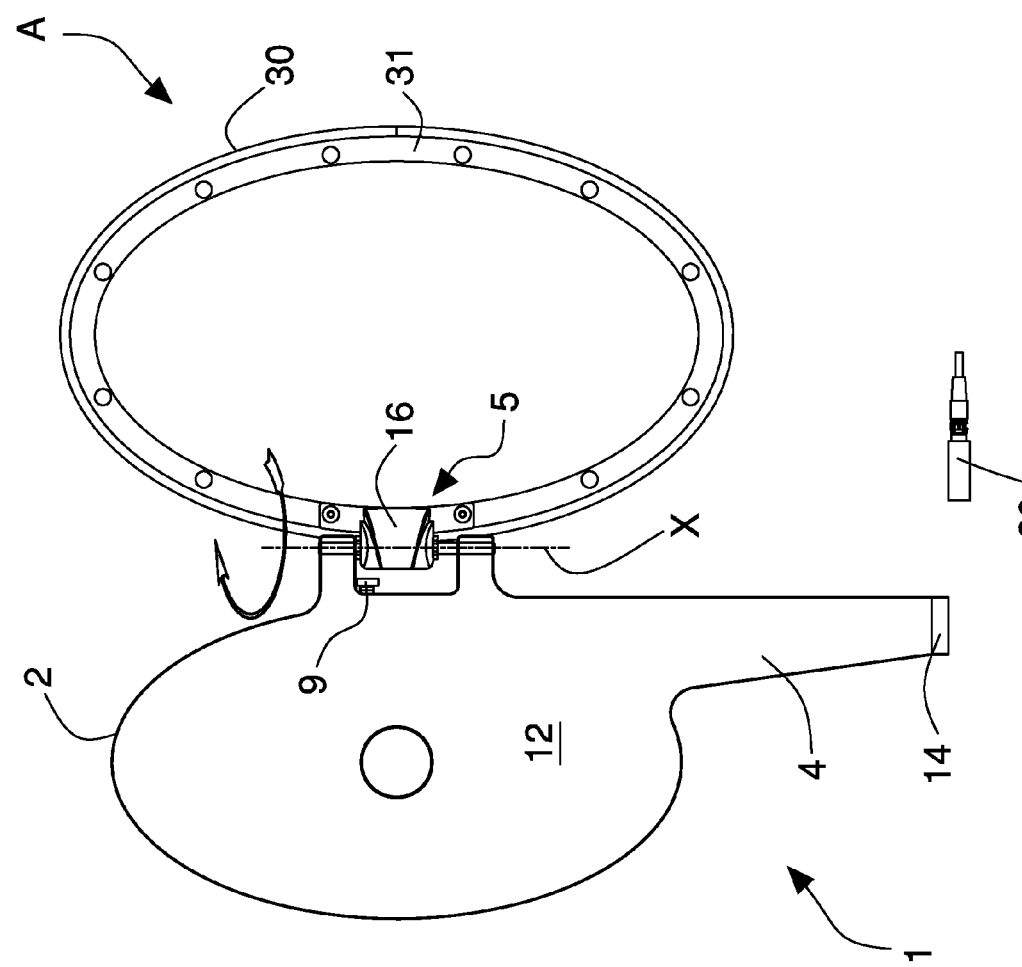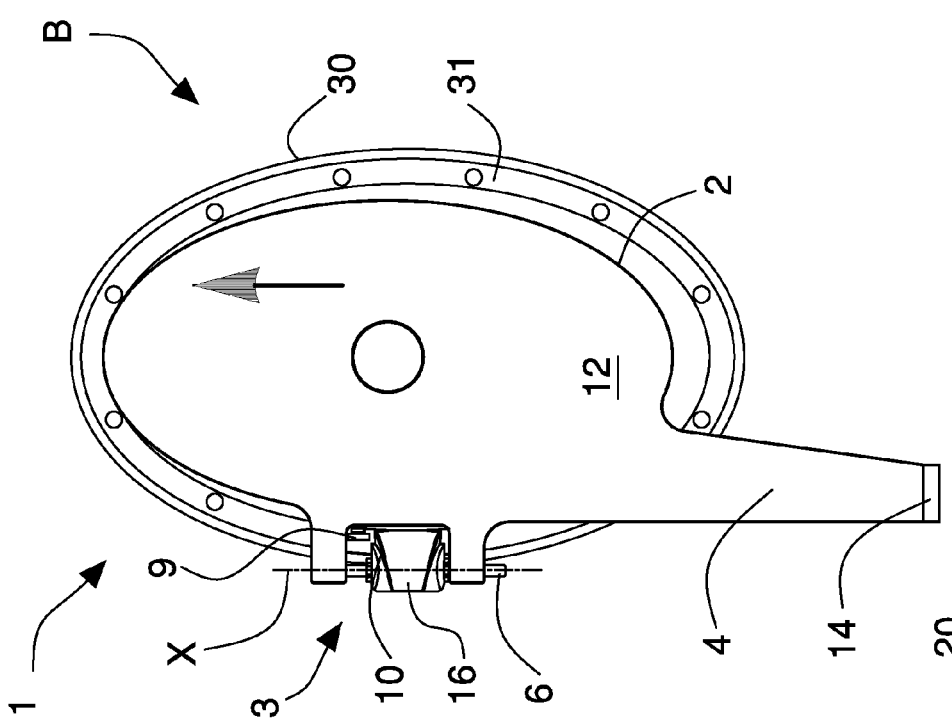

GLOVE PORT SAFETY MECHANISM

This application is continuation of application Ser. No. 13/879,054 filed Apr. 12, 2013 (with an effective filing date of Jul. 8, 2013) which was a §371 National Stage Entry of PCT International Application No. PCT/IB2011/054382 filed Oct. 5, 2011. PCT/IB2011/054382 claims priority to IT Application No. BO2010A000622 filed Oct. 15, 2010. The entire contents of these applications are incorporated herein by reference.

BACKGROUND OF THE INVENTION

The present invention relates to containing or barrier systems for biological, chemical, pharmaceutical use and in particular it refers to a protection system for openings with a glove, so-called "glove ports".

BRIEF DESCRIPTION OF THE PRIOR ART

As known, glove ports comprise openings to which sleeve gloves are fixed and are fixed to a generally transparent panel, of a stiff or flexible containing casing to enable an operator placed outside to handle in a safe and insulated manner objects located inside the casing. Typically, the glove ports are applied to panels or walls of containing structures such as insulators, RABS (Restricted Access Barrier Systems), "gloves boxes" used to separate a process area from a surrounding environment for protecting the process area from contaminants coming from the outside or vice versa, for protecting the surrounding environment from harmful and dangerous products which are in the process area. In the pharmaceutical field, the use of the aforesaid containing systems (insulators, RABS) is known that are associated with automatic machines for packaging pharmaceutical products in a controlled atmosphere, typically in aseptic and/or sterile conditions. In this case, using the glove ports enables the operators to access operating units and mechanisms of the machine during the packaging process, e.g. for performing maintenance and/or restoration operations, maintaining the sterility of the process zone intact.

For reasons of safety, in order to avoid accidents and injury, operators cannot approach with the gloves parts or operating units of the machine when the machine is running. In order to prevent this happening accidentally, safety systems are provided that stop the machine.

The aforesaid safety systems generally comprise a photocell barrier with light beams arranged in such a manner as to intercept the openings of the glove ports. In this manner, inserting a hand or an arm inside a glove breaks the light beams of the photocells, which then emit an alarm and machine stop signal.

The photocells can be arranged inside the containment booth, in such a manner as to be activated only by inserting a hand or arm inside the glove. A safety system of this type has the advantage of stopping the machine only in the event of an actual intervention of an operator. However, such a system can have problems in terms of operator safety. In fact, the photocells in order to be able to operate correctly, i.e. not generate false readings, need to be positioned at a first minimum distance from the wall. At the same time, the photocells have to be positioned at a second minimum distance from the machine to enable the latter to stop before the operator can touch the moving parts of the machine. It is in fact known that the machine does not stop instantly and simultaneously with the activation of the photocells.

It is not always possible to use such a safety system, because sometimes the containment booth does not offer sufficient space to ensure that the first and the second minimum distance are guaranteed.

Further, in the case of containment booths subject to automatic cleaning and sterilising cycles (CIP/SIP), it is necessary to use suitable, particularly costly and sophisticated photocells.

Positioning the photocells outside the containment booth is also known. In this case, there generally do not exist difficulties in maintaining the first minimum distance, and also the second minimum distance is increased compared with the preceding solution. The photocells can be activated by the introduction of the hand into the glove or by the opening of covers or hatches protecting the glove ports.

Nevertheless, the photocells can be involuntarily activated (by breaking the corresponding light beams) also accidentally by operators who approach too close to the walls on which the photocells are positioned, or by guard hatches that are not completely closed.

SUMMARY OF THE INVENTION

An object of the present invention is to improve known safety systems for glove ports, in particular for glove ports used on containment booths associated with automatic machines for packaging pharmaceutical products in a controlled atmosphere.

Another object is to provide a safety system for glove ports that is able to generate an alarm signal for stopping the packaging machine in such time as to prevent an operator with the glove being able to touch still moving parts of the machine.

A still further object is to devise a safety system for glove ports that is not accidentally activatable, but only in the event of operators actually using the gloves.

Still another object is to devise a safety system with reduced overall dimensions.

These and still other objects are achieved by a safety system for glove ports carried out according to any one of the claims set out below.

BRIEF DESCRIPTION OF THE FIGURES

The invention can be better understood and implemented with reference to the attached drawings that illustrate some embodiments thereof by way of non-limiting example, in which:

FIG. 2 is a partial section according to line II-II of FIG. 1;

FIG. 3 is a side view of the safety device in FIG. 1;

FIG. 4 is an enlarged detail of FIG. 3, illustrating a hinge of the safety device;

FIGS. 7 and 8 are front views that illustrate an opening sequence of the closing device of FIG. 1.

DETAILED DESCRIPTION

Figure 1:
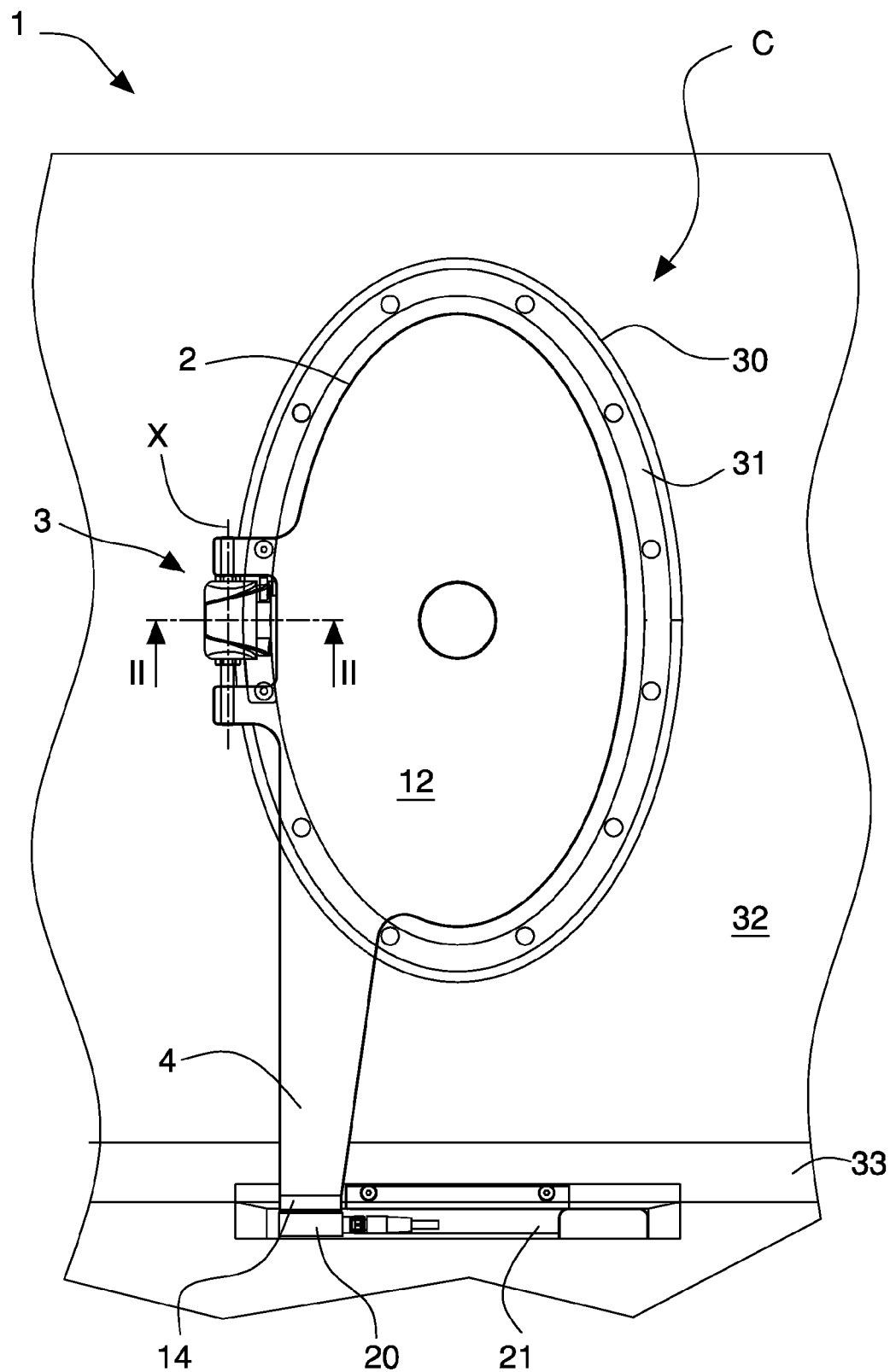
FIG. 1 is a front view of a safety device of the invention applied to a glove port and in a closing position.

With reference to FIGS. 1 to 8, with reference 1 there is indicated a safety device 1 connected to a glove port 30 comprising a glove that is not illustrated. The glove port 30 has an oval shape and is applied to a fixed wall 32 of a casing or containment booth that is of known type and is not illustrated in the figures that is associable with an automatic machine for packaging pharmaceutical products in a controlled (aseptic or sterile) atmosphere.

The device includes a hatch 2 that is rotatably fixed by a hinge 3 to an outer frame 31 of the glove port 30 in such a manner as to rotate about an axis X between a closing position C and an opening position A respectively for preventing or allowing access to the glove port 30 and thus to the interior of the containment booth.

The device further includes a sensor 20 associated with the glove port 30 and arranged for engaging and/or detecting an abutment portion 4 of the hatch 2 in the closing position C and generating an alarm and automatic machine stop signal when said abutment portion 4 does not engage the sensor 20, in particular when the hatch 2 is not in the closing position C.

The hatch 2 is moreover axially movable along the axis X between the closing position C and a raised intermediate position B, in which the abutment portion 4 does not engage the sensor 20, which thus controls the stop of the automatic machine.

By virtue of the limited axial movement of the hatch 2 between the closing position C an the intermediate position B, it should be noted how in the intermediate position B the hatch 2 anyway prevents access to the glove port 30, whilst at the same time ensuring that the machine stops. In other words, the safety device 1 enables the automatic machine to be stopped even before the hatch 2 is opened, to the entire advantage of operator safety and only when actually required, avoiding involuntary stops.

The hatch 2 includes a flat central body portion 12, for example with uniform thickness, having a shape substantially corresponding to that of the opening of the glove port 30 in such a manner as to completely block access therethrough in the closing position C. The abutment portion 4 has an elongated shape and extends laterally, for example downwards, from the central body portion 12 to form a lever, the free end of which is able to interact with the sensor 20.

The hinge 3 includes a pivot assembly 5 fixed to the outer frame 31 and provided with a pivot pin 6 arranged for engaging with a fork element 7, 8 of the hatch 2 for rotatably and slidingly supporting the latter about and along the axis X. The fork element includes a pair of appendages 7, 8 connected to the central body portion 12 and provided with respective through holes that are suitable for rotatably and slidably housing opposite ends of the pivot pin 6.

The hatch 2 is provided with a roller 9 mounted free to rotate and arranged for engaging with a cam arrangement 10, 11 made on the pivot assembly 5. The roller 9 and the cam arrangement 10, 11 are configured for axially moving the hatch 2 during an opening/closing rotation thereof about said axis X.

Figure 6:
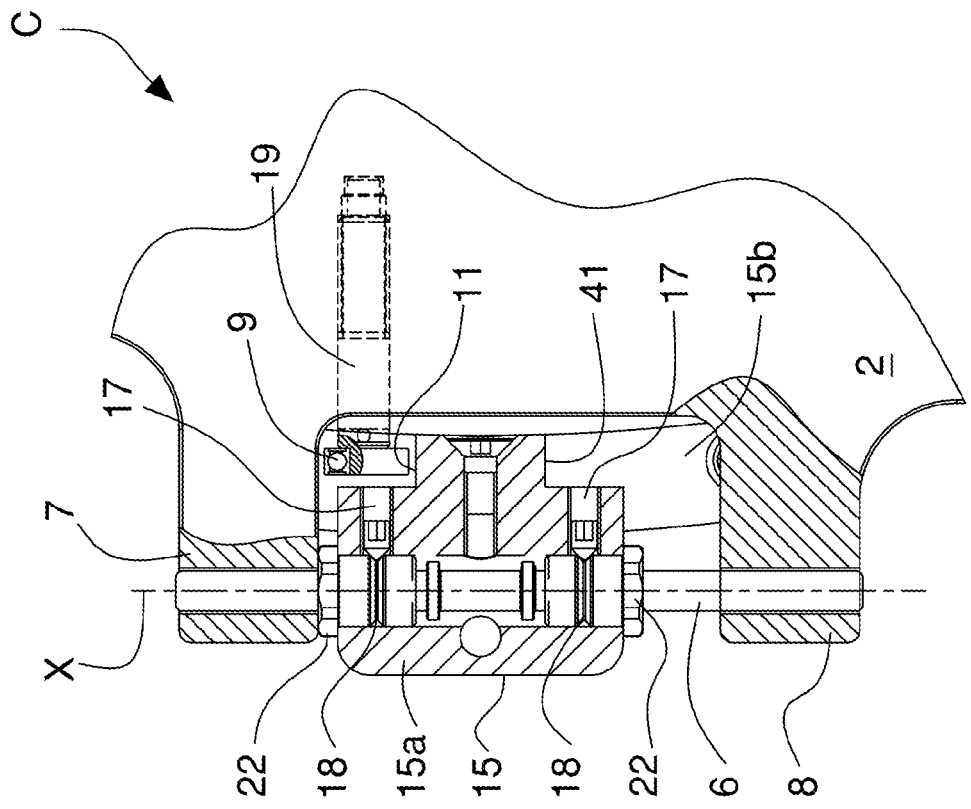
FIG. 6 is a partial cross section of the hinge of FIG. 5.
Figure 5:
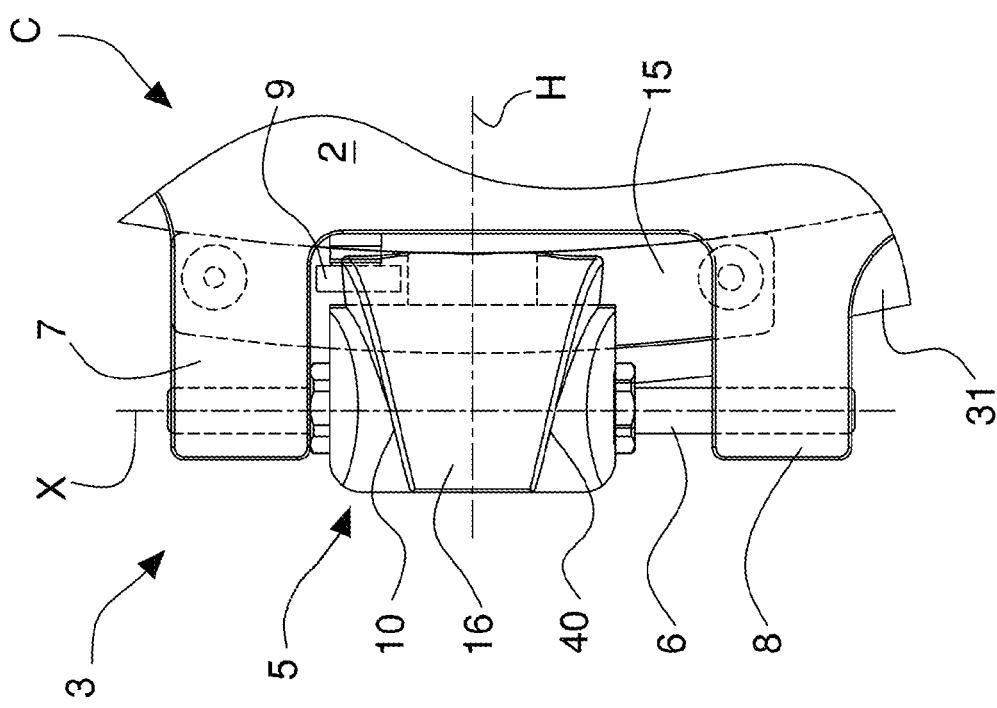
FIG. 5 is an enlarged detail of FIG. 1, illustrating a hinge of the safety device in the closing position.

The roller 9 comprises, for example, a ball bearing mounted in a cantilevered manner on a supporting shaft 19 fixed to the central body portion 12 of the hatch 2 (see FIGS. 5 and 6).

The pivot assembly 5 includes a first element 15 and a second element 16 fixed together, for example by screws. The first element 15 is provided with a supporting portion 15a having a through seat that is suitable for housing a central portion of the pivot 6 and a supporting portion 15b for connecting, for example by screws, to the outer frame 31 of the glove port 30.

The pivot 6 is positioned and connected axially to the first element 15, for example, by a pair of grub screws 17 acting on annular grooves 18 made on said pivot 6 and a pair of tightening nuts 22 acting on opposite walls of the first element 15 (see FIG. 6).

The second element 16 is provided with the cam arrangement that comprises a recess 11 and a race 10. The recess 11 is arranged for housing and containing the roller 9 in the closing position C of the hatch 2.

The race 10 includes a machined surface, tilted downwards, on which the roller 9 can roll in such a manner as to guide axially the hatch 2 from the intermediate position B, wherein said roller 9 is disengaged from the recess 10, to the opening position A and vice versa.

By virtue of the tilt downwards of the race 10 and the weight of the hatch 2, the latter (through the force of gravity) rotates in opening and is maintained in the opening position A without any need for intervention by the operator.

In a version of the device that is not illustrated in the figures, it is provided that the race 10 is tilted upwards, from the recess 11, in such a manner that through the effect of gravity the hatch 2 rotates in closure and tends to move from the opening position A to the intermediate position B, and then to the closing position C, without any need for intervention by the operator. The second element 16 of the pivot assembly 5 is further provided with a further cam arrangement 40, 41 that is substantially identical to said cam arrangement 10, 11 and is symmetrical with the latter with respect to a middle reference plane H that is orthogonal to said axis X. In this manner, the hinge 3 enables the hatch 2 to be mounted indifferently on the left side or on the right side of the glove port 30. In fact, in the mounting configuration illustrated in the figures (in particular see FIGS. 7 and 8), in which the hatch is fixed to the left side of the outer frame 31 of the glove port 30 and rotates to open clockwise about the axis X, the cam arrangement 10, 11 enables the hatch 2 to be moved axially in cooperation with the roller 9. On the other hand, when the hatch 2 is fixed to the right side of the outer frame 31, the pivot assembly is mounted upturned with respect to the figures (i.e. rotated by 180° about an axis that is perpendicular to the plane defined by the wall 32) and it is the further cam arrangement 40, 41 that enable axial movement of the hatch 2. The hatch 2, in turn, will be mounted rotated by 180° about the axis X.

The sensor 20 is fixed by an anchoring member 21 to a stationary supporting frame 33 on which the wall 32 of the containment booth is mounted, for example in a zone below the glove port 30.

The sensor 20 includes contact sensors, or proximity sensors, for example of inductive, capacitive or magnetic type and includes an active sensor that is able to detect a passive element 14 fixed to the free end of the abutment portion 4.

The sensor 20 is connectable to a control unit of the packaging machine, which is of known type and is not illustrated, to send at least an alarm and automatic machine stop signal when the active sensor does not detect the presence of the passive element 14 i.e. when the hatch 2 is not in the closing position C.

It should be noted that the safety device 1 of the invention is applicable to a glove port of any type, shape and dimension as the hatch 2 can be suitably shaped. The safety device 1 is also suitable for being installed on containing systems such as already existing and operating insulators, RABS or the like. Further, the safety device 1 can be applied to a glove ports mounted on movable walls 32, for example that are part of inspection/maintenance doors. In the case of movable walls 32, the sensor 20 can detect both the opening of the hatch 2 and the opening of the door, also with the hatch 2 in the closing position C.

With particular reference to FIGS. 1, 7 and 8, the hatch 2 of the safety device 1 in the closing position C closes the access to the glove port 30 in such a manner as to prevent a hand or finger being inserted in the glove (hot shown) fixed to the glove port 30 and arranged inside the containment booth. In this position, the passive element 14 of the abutment portion 4 faces and substantially abuts on the active sensor 20 which detects the presence thereof.

It should be noted that in this closing position C the hatch is further mechanically blocked and prevented from rotating in opening by virtue of the roller 9 that is contained in the recess 11 of the cam arrangement. In this manner, accidental openings of the hatch 2 are prevented. Basically, the roller 9 and the recess 11 act as a blocking system for the hatch 2 in the closing position C.

In order to open the hatch 2, in a first step it is necessary to lift the hatch 2, i.e. move the hatch upwards along the axis X, to the intermediate position B, then in a second step to rotate the hatch about the axis X, for example clockwise, with the roller 9 resting on the race 10 of the cam arrangement, as far as the opening position A.

During the second step, the hatch 2 rotates and is moved axially downwards, helped by a suitable tilt of the race 10. The hatch 2 in the opening position A is axially lower than the intermediate position B in order to ensure that the hatch is kept open without any intervention by the operator.

Similarly, by virtue of the weight of the hatch, opening through rotating occurs substantially automatically.

In order to close the hatch 2, it is necessary to repeat the two steps disclosed above backwards, exerting in the rotation step from the opening position A to the intermediate position B a sufficient force to overcome the component of the weight force of the hatch 2 acting on the cam arrangement.

It should noted that in opening, as soon as the hatch 2 is raised to the intermediate position B, the active sensor 20 stops detecting the presence of the passive element 14 of the abutment portion 4 and generates the alarm and automatic machine stop signal before the hatch 2 is rotated, giving access, although only minimal, to the glove port 30. The time that is necessary to the operator to finish opening the hatch 2, insert a hand into the glove and possibly reach a part or component in the machine is always much greater than a stop time that is necessary for the machine to stop completely once the alarm and stop signal has been received by the sensor. In this manner, the safety of the operators is ensured in any operating condition.

Modifications can be made to the disclosed safety system that fall within the scope of the present invention.

In an embodiment that is not shown, the hatch 2 can be mounted in a cantilevered manner, at a suitable distance from the outer frame 31 of the glove port 30 to enable the glove to exit from the containment booth also with the hatch 2 in the closing position. The sensor 20 will also be suitably mounted on the supporting frame 33 in a cantilevered manner to abut correctly on the abutment portion 4 of the hatch 2.

Alternatively, the hatch 2 can have a dimension that is less than the dimension of the corresponding glove port 30 in such a manner as to leave open a portion of the glove port 30 from which the glove can exit but into which a hand cannot be inserted.

The embodiments with a glove that exits from the glove port further delay the insertion of the hand inside the containment booth, to the advantage of operator safety, for example for machines with relatively long stopping times.

Further, in a further embodiment that is not shown, to the supporting frame 33 a further safety device can also be connected for blocking the hatch 2 and preventing access to the automatic machine through the glove port 30. The further safety device can includes a pivot, which is controllable automatically, that is suitable for being coupled with a corresponding seat obtained in the hatch 2 to block the hatch 2 in the closing position C. The further safety device finds application in automatic machines subjected to heat treatments, for example hot cleaning and/or sterilisation cycles, to which, for safety reasons, access by operators must be prevented for the time required for the machine to cool. The pivot can be controlled to disengage the seat of the hatch 2 after a set lapse of time. In such an embodiment, even if it is sought to raise the hatch 2 to open the hatch 2, the hatch 2 is automatically blocked in the closing position C by the further safety device.

The invention claimed is:

1. A method for stopping an automatic machine comprising a safety device for a glove port, the safety device comprising a hatch providing access to the glove port, the hatch including an appendage containing a through hole, a hinge connecting the hatch with a frame of the machine and including a pivot pin fixed to the frame by a pivot assembly and arranged in the appendage through hole, the pivot assembly including a cam containing a recess, and an active sensor that detects an element fixed to a portion of the hatch when the hatch is in a closed position, said method comprising mechanically blocking the hatch in the closed position where the hatch is adjacent to the frame and prevented from rotating by a roller mounted on the hatch and arranged in the cam recess to prevent access to the glove port, opening the hatch by rotating the hatch about an axis X to the open position where the hatch is away from the frame to allow access to the glove port;

and before the hatch is rotated there being provided the steps of:
(a) linearly displacing the hatch along the axis X from the closed position to an intermediate position in which the active sensor stops detecting the element, the hatch is linearly displaced relative to the frame and continues to prevent access to the glove port, and the roller is out of the cam recess to engage a race of the cam,
(b) generating an alarm and stop signal for the automatic machine when the hatch reaches the intermediate position where the hatch is linearly displaced relative to the frame, and
(c) stopping the automatic machine when the alarm and stop signal are generated, and wherein
the step of rotating the hatch about the axis X from the intermediate position to the open position being provided after the alarm and stop signal have been generated.

2. A method according to claim 1, wherein the linearly displacing step comprises lifting the hatch to the intermediate position, the intermediate position being a raised position axially above said closed position.

3. A method according to claim 1, wherein the linearly displacing step comprises linearly displacing the element away from the active sensor, whereby the active sensor does not detect the presence of the element.

4. A method for stopping an automatic machine comprising the steps of:
(a) providing a glove port in the automatic machine;

(b) providing a safety device comprising a hatch which affords access to the glove port, the hatch including an appendage containing a through hole, a hinge connecting the hatch with a frame of the automatic machine and including a pivot pin fixed to the frame by a pivot assembly and arranged in the appendage through hole, the pivot assembly including a cam containing a recess, and an active sensor connected with the frame of the automatic machine for detecting an element connected with a portion of the hatch when the hatch in a closed position;

(c) mechanically blocking the hatch in the closed position where the hatch is adjacent to the frame and prevents access to the glove port and is prevented from rotating by a roller mounted on the hatch and arranged in the cam recess;

(d) opening the hatch by rotating the hatch about an axis X to an open position where the hatch is away from the frame to allow access to the glove port, and before the hatch is rotated there being provided the steps of:

(e) linearly displacing the hatch along the axis X while preventing rotational movement of the hatch about the axis X from the closed position to an intermediate position in which the active sensor stops detecting the element, the hatch is linearly displaced relative to the frame but continues to prevent access to the glove port, and the roller is out of the cam recess and engages a race of the cam, (f) generating an alarm and a stop signal for the automatic machine when the hatch reaches the intermediate position where the hatch is linearly displaced relative to the frame, and (g) stopping the automatic machine when the alarm and stop signal are generated, and wherein the step of rotating the hatch about the axis X from the intermediate position to the open position being provided after the alarm and stop signal have been generated.

* * * * *